United States Patent
Sattler et al.

(10) Patent No.: US 9,482,344 B2
(45) Date of Patent: Nov. 1, 2016

(54) ARRANGEMENT WITH A RADIAL SHAFT SEAL HAVING A SINUSOIDALLY CURVED SEALING EDGE

(71) Applicant: Carl Freudenberg KG, Weinheim (DE)

(72) Inventors: Holger Sattler, Wald-Michelbach (DE); Erich Prem, Hemsbach (DE)

(73) Assignee: CARL FREUDENBERG KG, Weinheim (DE)

( * ) Notice: Subject to any disclaimer, the term of this patent is extended or adjusted under 35 U.S.C. 154(b) by 36 days.

(21) Appl. No.: 14/705,557

(22) Filed: May 6, 2015

(65) Prior Publication Data
US 2015/0354705 A1 Dec. 10, 2015

(51) Int. Cl.
*F16J 15/32* (2016.01)

(52) U.S. Cl.
CPC ........... *F16J 15/3216* (2013.01); *F16J 15/324* (2013.01); *F16J 15/3204* (2013.01); *F16J 15/3244* (2013.01); *F16J 15/3268* (2013.01)

(58) Field of Classification Search
CPC .. F16J 15/3204; F16J 15/324; F16J 15/3244; F16J 15/3284
USPC .................................................. 277/560, 559
See application file for complete search history.

(56) References Cited

U.S. PATENT DOCUMENTS

| | | | | |
|---|---|---|---|---|
| 3,672,690 A * | 6/1972 | Berens | ................. | F16J 15/3244 277/559 |
| 3,929,340 A * | 12/1975 | Peisker | ................. | F16J 15/3244 277/559 |
| 4,440,405 A * | 4/1984 | Schaus | ................. | F16J 15/3204 277/559 |
| 5,143,385 A * | 9/1992 | Sponagel | ............ | F16J 15/3244 277/559 |
| 6,056,292 A * | 5/2000 | Gerigk | ................... | F16J 15/324 277/549 |
| 6,520,506 B2 * | 2/2003 | Reinhardt | ............ | F16J 15/3208 277/549 |
| 6,729,624 B1 * | 5/2004 | Johnston | .............. | F16J 15/3244 277/351 |
| 8,322,726 B2 * | 12/2012 | Kurth | ................... | F16J 15/3232 277/559 |
| 2003/0230852 A1 * | 12/2003 | Bengoa | ................ | F16J 15/3244 277/403 |
| 2005/0093246 A1 * | 5/2005 | Dietle | .................... | F16J 15/008 277/549 |
| 2006/0170166 A1 * | 8/2006 | Bengoa | ................ | F16J 15/3264 277/371 |
| 2006/0214380 A1 * | 9/2006 | Dietle | .................. | F16J 15/3208 277/559 |
| 2012/0126490 A1 * | 5/2012 | Maskaliunas | ............ | F16J 15/48 277/572 |
| 2015/0008645 A1 * | 1/2015 | Epshetsky | ............ | F16J 15/3208 277/307 |

FOREIGN PATENT DOCUMENTS

DE            19522890 C1     2/1997

* cited by examiner

*Primary Examiner* — Kristina Fulton
*Assistant Examiner* — Nicholas L Foster
(74) *Attorney, Agent, or Firm* — Harness, Dickey & Pierce, P.L.C.

(57) ABSTRACT

An arrangement includes a radial shaft seal (2) that surrounds a shaft (1), wherein an elastomer body (4) forms a sealing lip (5) for bearing against the shaft (1), wherein the sealing lip (5) has a sinusoidally curved sealing edge (6) on its side which faces the shaft (1), which sealing edge runs around along the inner circumference of the sealing lip (5), and wherein the sealing edge (6) bears against the circumferential face (7) of the shaft (1). The radial shaft seal as a single component is able to produce high dynamic seal tightness in a plurality of different applications.

7 Claims, 4 Drawing Sheets

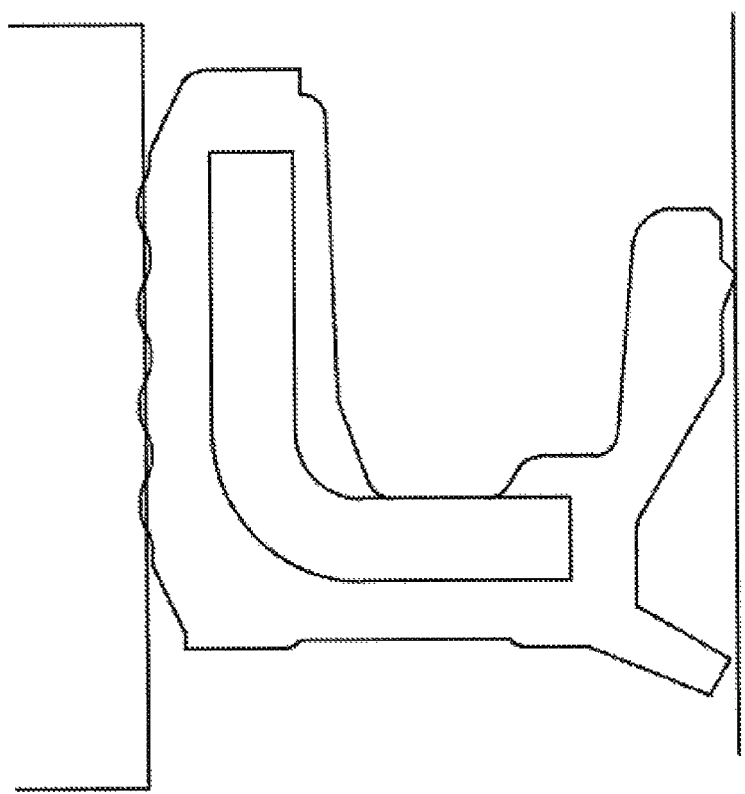

ARRANGEMENT WITH A RADIAL SHAFT SEAL HAVING A SINUSOIDALLY CURVED SEALING EDGE

CROSS-REFERENCE TO RELATED APPLICATIONS

This application claims the benefit and priority of German Application No. 10 2014 007 968.6, filed Jun. 4, 2014. The entire disclosure of the above application is incorporated herein by reference.

FIELD

The disclosure relates to an of a radial shaft seal for sealing against a shaft.

BACKGROUND

A radial shaft seal having a sinusoidally curved sealing edge is known from DE 195 22 890 C1.

Known radial shaft seals are frequently unable to guarantee a tight seal against lubricants, in particular oils, and therefore are usually combined with a standard seal. One such combination is disclosed in FIG. 1 of DE 195 22 890 C1.

In light of the above background, a demand exists for a radial shaft seal which forms a reliable and proper seal against all types of lubricants, largely independently of operating conditions and particularly independently of shaft speeds and independently of the direction of rotation of the shaft, so that an additional sealing element is no longer necessary.

SUMMARY

The object of the disclosure is therefore to design and to develop an arrangement of the type described in the introductory part, such that in said arrangement, a radial shaft seal as a single component is able to produce high dynamic seal tightness in a plurality of different applications.

According to the disclosure, it was first recognized that a tight seal against oil can be achieved using a single sealing element. A combination of a plurality of radial shaft seals is not necessary, and is not provided according to the disclosure. A radial shaft seal has a sealing lip with a sinusoidally curved sealing edge, wherein in the installed state, the sealing edge forms two angles with the longitudinal axis of the shaft. According to the disclosure, the angles are chosen such that a tight seal, at least against oil, is produced. As a result of a fortunate choice, angle ranges were discovered which, when enhanced by additional geometric parameters, ensure defect-free seal tightness against all types of lubricants. According to the disclosure, the seal tightness is ensured largely independently of operating conditions, and particularly of shaft speeds.

The problem stated in the introductory part is therefore solved.

The sum of the angles which the first flank and the second flank enclose with the longitudinal axis, in each case at a point on the circumferential face, could measure 90°. This results in a particularly effective sealing effect. As an additional advantage, dirt particles are forced back to the lubricant side.

The double amplitude of the sinusoidally curved sealing edge could be between 0.3 and 1.0 mm. In this manner, a relatively wide strip face is formed on the circumferential face by the sealing edge. As a result, heat is removed substantially more quickly into the shaft. Thus the critical sealing lip temperature is much lower than that of conventional sealing lips. The lubricant is also damaged thermally and mechanically much less than with conventional sealing lips.

The sealing lip could function without loading by a spring. Relatively costly coiled springs, which usually press a sealing lip against a circumferential face, could advantageously be dispensed with. Preferably, no coiled spring or similar separate spring is provided for pressing the sealing lip against the circumferential face.

The sealing edge could be adjoined axially by an auxiliary sealing edge, which is spaced apart from the circumferential face by a spacing (s). As a result, a type of annular gap or annular space is created, which can function as a lubricant depot.

The spacing (s) could lie in the range from 0.03 to 0.05 mm. To guarantee pressure stability of up to 10 bar, the circumferential auxiliary sealing edge is arranged downstream of the annular space, which serves simultaneously as a lubricant depot. In the pressureless state, said auxiliary sealing edge maintains the spacing (s) in the stated range from the circumferential face of the shaft, and under pressure, bears against the shaft. As a result, additional, pressure-induced contact force is compensated for, and pressure on the sinusoidal sealing edge is relieved.

The sealing edge could protrude from a face of the sealing lip, which face faces the shaft, the face being spaced apart from the circumferential face by a gap distance (x) in the range from 0.05 to 0.5 mm. This gap distance results in a tight seal, while at the same time, dirt particles are kept on the lubricant side.

The tip of the sealing edge could be spaced apart from a lubricant-side end of the sealing lip by between 0.5 and 1 mm. This spacing length leads to a tight seal, while at the same time, dirt particles are kept on the lubricant side.

A press fit could be arranged between a housing and the support of the radial shaft seal. The press fit is advantageously made of an elastomer. A metal-metal seal, as disclosed in DE 195 22 890 C1, is thereby avoided.

A radial shaft seal could be used in an arrangement of the type described here. A radial shaft seal having the design features peculiar to it as described in the claims, alone or in combination, in reference to the arrangement, produces highly advantageous results in terms of a seal against lubricants.

DRAWINGS

The drawings show

FIG. 4 is a radial shaft seal having a conventional sealing lip made of an elastomer, attached upstream.

DETAILED DESCRIPTION

Figure 1:
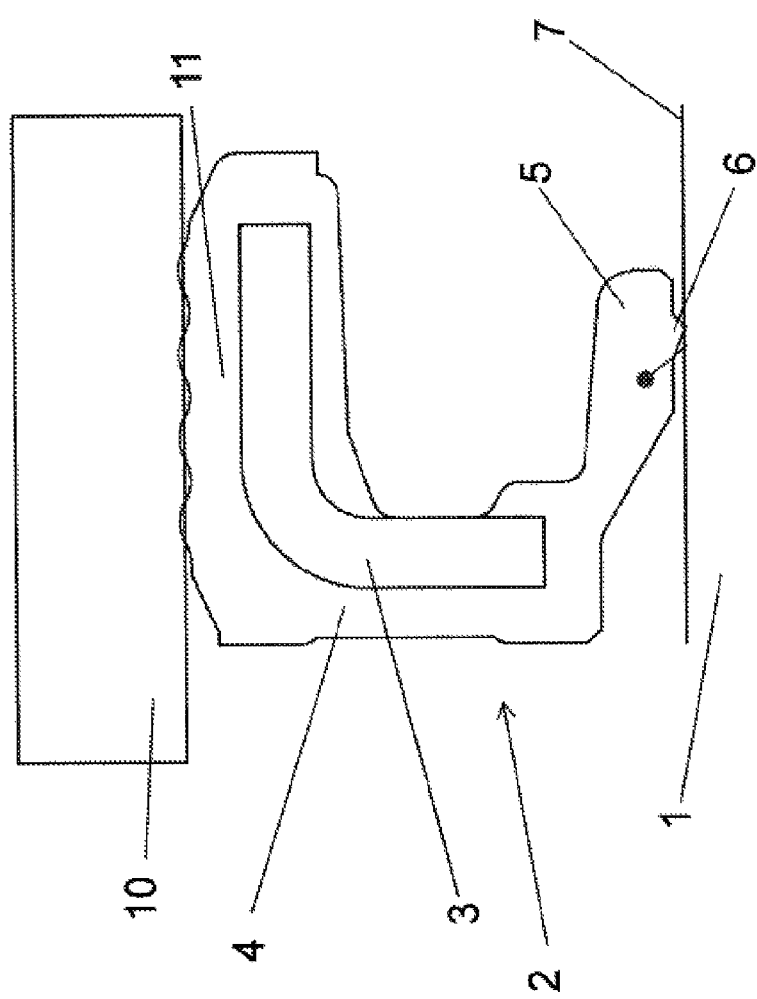
FIG. 1 is a partial sectional view of an arrangement which comprises a radial shaft seal having a sinusoidally curved sealing edge, which bears against a circumferential face of a shaft.

FIG. 1 shows an arrangement which comprises a shaft 1 and a radial shaft seal 2, wherein the radial shaft seal 2 surrounds the shaft 1, wherein the radial shaft seal 2 has a support 3, which is connected to an elastomer body 4, wherein the elastomer body 4 forms a sealing lip 5 for bearing against the shaft 1, wherein the sealing lip 5 has a sinusoidally curved sealing edge 6 on its side which faces the shaft 1, which sealing edge runs around along the inner circumference of the sealing lip 5, and wherein the sealing edge 6 bears against the circumferential face 7 of the shaft 1.

The support 3 is made of metal.

Figure 2:
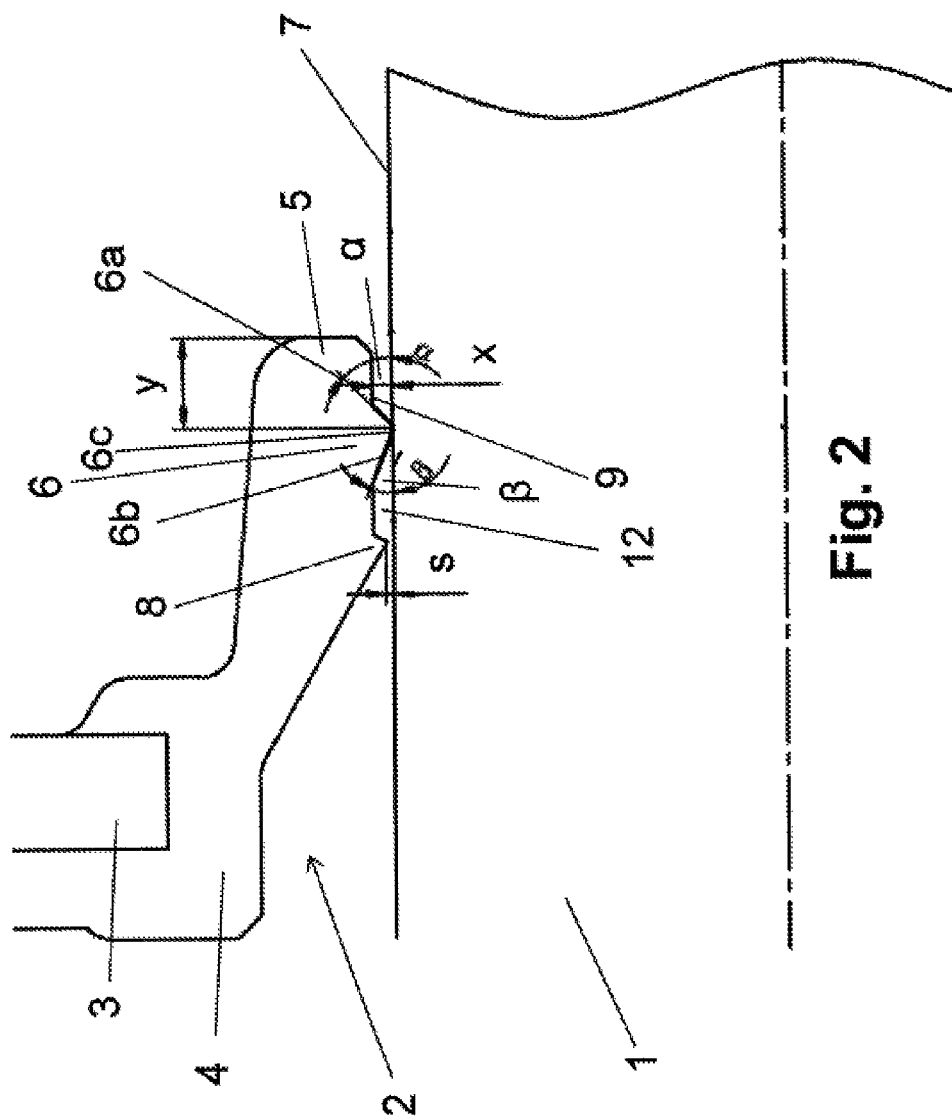
FIG. 2 is an enlarged, partial sectional view of the sealing edge according to FIG. 1.

FIG. 2 shows, in a detailed view, that the sealing edge 6 has a first flank 6a which encloses at least an angle ($\alpha$) in the range from 40° to 80° with the longitudinal axis of the shaft 1, and that the sealing edge 6 has a second flank 6b which encloses at least an angle ($\beta$) in the range from 10° to 60° with the longitudinal axis of the shaft 1.

The angle ($\alpha$) is formed on the lubricant side.

The sum of the angles which the first flank 6a and the second flank 6b enclose with the longitudinal axis in each case at a point on the circumferential face 7 is 90°.

The double amplitude (2a) of the sinusoidally curved sealing edge 6 is between 0.3 and 1.0 mm.

The sealing lip 5 is not loaded by a spring.

The sealing edge 6 is adjoined axially by an auxiliary sealing edge 8 which is spaced apart from the circumferential face 7 by a spacing (s). The spacing (s) lies in the range from 0.03 to 0.05 mm.

The sealing edge 6 protrudes from a face 9 of the sealing lip 5, which face 9 faces the shaft 1, the face 9 being spaced apart from the circumferential face 7 by a gap distance (x) in the range from 0.05 to 0.5 mm.

The tip 6c of the sealing edge 6 is spaced apart from a lubricant-side end of the sealing lip 5 by a length (y) which is between 0.5 and 1 mm.

FIG. 1 shows that a press fit 11 made of an elastomer is arranged between a housing 10 and the support 3 of the radial shaft seal.

FIG. 2 shows specific features that are required to ensure an optimal sealing function. The sealing lip 5 has 3-5 sinusoidal periods along its inner circumference, depending on the shaft diameter.

The geometry of the sealing edge 6 of the sealing lip 5 is defined by angles $\alpha$ and $\beta$, the gap distance (x) and the length (y). a corresponds to the amplitude of the sinusoidal shape. s describes the spacing between the auxiliary sealing edge 8 and the circumferential face 7 of the shaft 1. These parameters preferably have the following values:

$\alpha$=40-80°
$\beta$=10-60°
wherein the sum of the two angles should preferably be 90°, and the two angles may have the same value.
x=0.05-0.5 mm
y=0.5-1.5 mm
2a=0.3-1.0 mm
s=0.03-0.05 mm The axial extension of the sealing edge 6, that is, the double amplitude, is 0.3 to a maximum of 1.0 mm, depending on the shaft diameter.

The number of sinusoidal periods with a shaft diameter of 5-25 mm is preferably three, and with a shaft diameter of 25-200 mm is preferably five.

The defined gap, which is established by parameters x and y, and the sinusoidal sealing edge 6 ensure that larger particles, which are frequently found in the space to be sealed, are not deposited on the sealing edge 6, where they could impact the sealing function.

To guarantee pressure stability of up to 10 bar, the circumferential auxiliary sealing edge 8 is arranged downstream of an annular space 12, which also serves as a lubricant depot. In a pressureless state, said auxiliary sealing edge maintains a spacing (s) from the circumferential face 7 of the shaft 1, and when pressurized, it bears against the shaft 1. In this manner, pressure-induced additional contact force is compensated for, and pressure on the sinusoidal sealing edge 6 is relieved.

Sinusoidal sealing edges 6 have the following advantages over conventional sealing edges:

They cover an up to 300% larger or wider strip surface over the shaft circumference than conventional sealing edges. As a result, heat is removed much more quickly into the shaft 1.

Thus the critical sealing lip temperature is much lower than that of conventional sealing lips. In addition, the lubricant is not damaged thermally and mechanically nearly as severely as with conventional sealing lips.

The sealing lip 6 is much more effectively lubricated due to its sinusoidal shape. The frictional heat and/or the power dissipation that are generated are therefore correspondingly lower. Lower shaft running-in and lower running track wear result.

Sinusoidal sealing edges generally have the disadvantage that, due to their shape, they do not provide a tight seal against low-viscosity lubricants in every speed range. Depending on the amplitude and the slope of the sinusoidal sealing edge, leaks can occur as a result of shaft speed and other operating conditions, such as a shaft impact, housing misalignment or wetting properties of the lubricants.

A further disadvantage is the at times tremendous conveying behavior of such sealing edges. Said edges constantly take in air, so that unacceptable levels of excess pressure frequently occur in axles and transmissions, or even motors, that are not vented.

Figure 3:
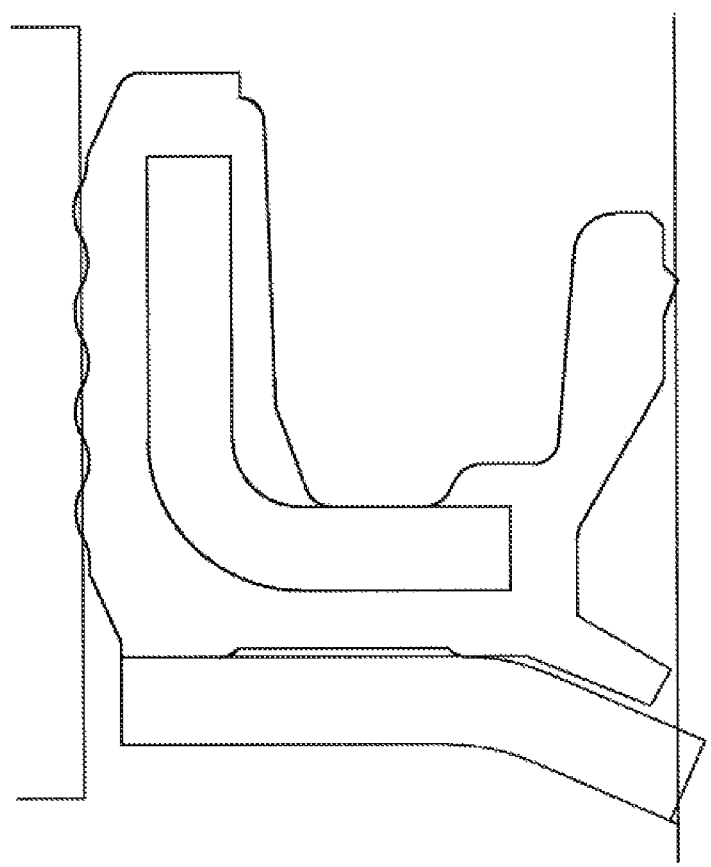
FIG. 3 is a radial shaft seal having a protective lip made of nonwoven material.

According to the disclosure, these disadvantages are compensated for by the specific embodiment of the sealing lip geometry. A secure seal is produced even on shafts that have a delivery swirl, generated during production. FIGS. 3 and 4 show additional radial shaft seals having sinusoidal sealing edges, in which an induction of air through a sealing lip made of elastomer and arranged upstream of said sealing edge (FIG. 4) and/or through a protective lip made of nonwoven fabric is minimized.

The invention claimed is:

1. An arrangement which comprises a shaft (1) and a radial shaft seal (2), the radial shaft seal (2) surrounding the shaft (1), the radial shaft seal (2) having a support (3) which is connected to an elastomer body (4), the elastomer body (4) forming a sealing lip (5) for bearing against the shaft (1), the sealing lip (5) having a sinusoidally curved sealing edge (6) on its side which faces the shaft (1), which sealing edge (6) runs around along the inner circumference of the sealing lip (5), and the sealing edge (6) bearing against the circumferential face (7) of the shaft (1), characterized in that the sealing edge (6) has a first flank (6a) which encloses at least an angle (a) in the range from 40° to 80° with the longitudinal axis of the shaft (1), and in that the sealing edge (6) has a second flank (6b) which encloses at least an angle (p) in the range from 10° to 60° with the longitudinal axis of the shaft (1), wherein the sealing edge (6) protrudes from a face (9) of the sealing lip (5), which face (9) faces the shaft (1), the face (9) being spaced apart from the circumferential face (7) by a gap distance (x) in the range from 0.05 to 0.5 mm, and wherein the sum of the angles which the first flank (6a) and the second flank (6b) enclose with the longitudinal axis in each case at a point on the circumferential face (7) is 90°.

2. The arrangement according to claim 1, wherein the double amplitude (2a) of the sinusoidally curved sealing edge (6) is between 0.3 and 1.0 mm.

3. The arrangement according to claim 1, wherein the sealing lip (5) is not loaded by a spring.

4. The arrangement according to claim 1, wherein the sealing edge (6) is adjoined axially by an auxiliary sealing edge (8) which is spaced apart from the circumferential face (7) by a spacing (s).

5. The arrangement according to claim 4, wherein the spacing (s) lies in the range from 0.03 to 0.05 mm.

6. The arrangement according to claim 1, wherein the tip (6c) of the sealing edge (6) is spaced apart from a lubricant-side end of the sealing lip (5) by between 0.5 and 1 mm.

7. The arrangement according to claim 1, wherein a press fit (11) is arranged between a housing (10) and the support (3) of the radial shaft seal (2).

\* \* \* \* \*